Figure 1:
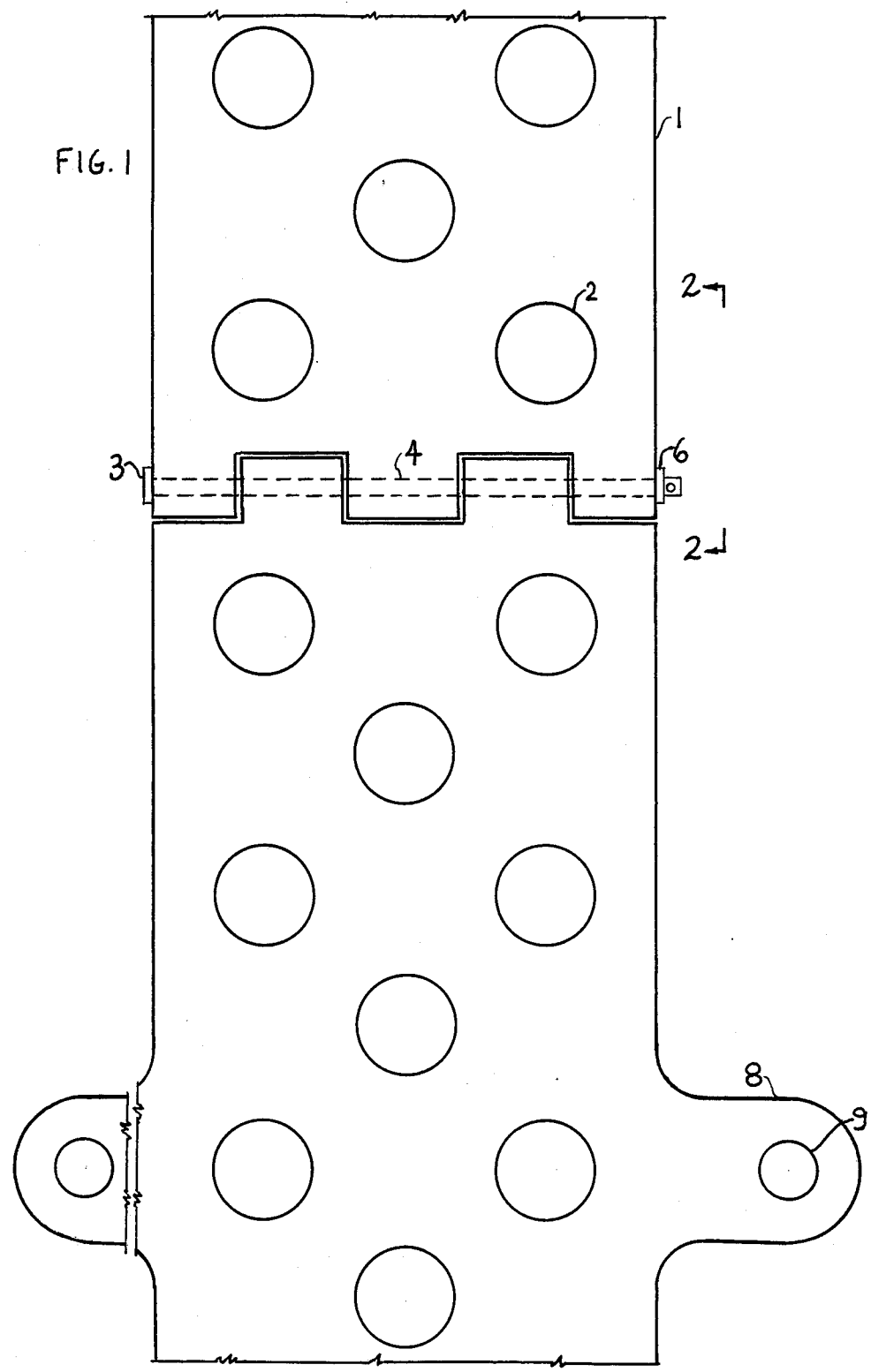

United States Patent [19]

Lenet

[11] Patent Number: 4,848,430
[45] Date of Patent: Jul. 18, 1989

[54] TIRE SNOW BELT

[76] Inventor: Leski Lenet, 867 St Clair St., Costa Mesa, Calif. 92626

[21] Appl. No.: 101,671

[22] Filed: Sep. 28, 1987

[51] Int. Cl.⁴ ............................................. B60C 11/06
[52] U.S. Cl. ................................ 152/221; 152/213 A
[58] Field of Search ............... 152/159, 170, 171, 172, 152/179, 185.1, 155, 175, 176, 177, 178, 187–189, 213 A, 217, 219, 221, 222; 24/298

[56] References Cited

U.S. PATENT DOCUMENTS

| | | | |
|---|---|---|---|
| 710,562 | 10/1902 | De Cates | 152/173 |
| 755,310 | 3/1904 | Nioré | 152/173 |
| 812,259 | 2/1906 | Caps | 152/173 |
| 870,796 | 11/1907 | Parker | 151/173 |
| 1,250,742 | 12/1917 | Wiesenberg et al. | 152/177 |
| 2,045,214 | 6/1936 | Coennig | 152/177 |
| 2,294,772 | 9/1942 | Cook | 152/179 |
| 3,797,549 | 3/1974 | Lieberum | 152/175 |
| 3,857,426 | 12/1974 | Reed | 152/185 |
| 3,893,497 | 7/1975 | Vagias | 152/179 |
| 4,408,646 | 10/1983 | Forsyth | 152/185.1 X |

Primary Examiner—Michael W. Ball
Assistant Examiner—Thomas Bokan

[57] ABSTRACT

A Tire Snow Belt made of a strip of rubber mounted on the circumferential surface of an automobile tire and having multiplicity of protrusions on the outside surface, that are of proper shape for increased traction on snow and interlinking ends with devices to join them and further having lugs for use, together with a cord, to tie the Tire Snow Belt securely on both sides of the tire; and an insert connected between the ends of the Tire Snow Belt will prolong its length for using it with a larger tire size.

5 Claims, 2 Drawing Sheets

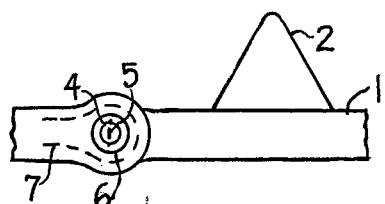
FIG 2
FIG. 3
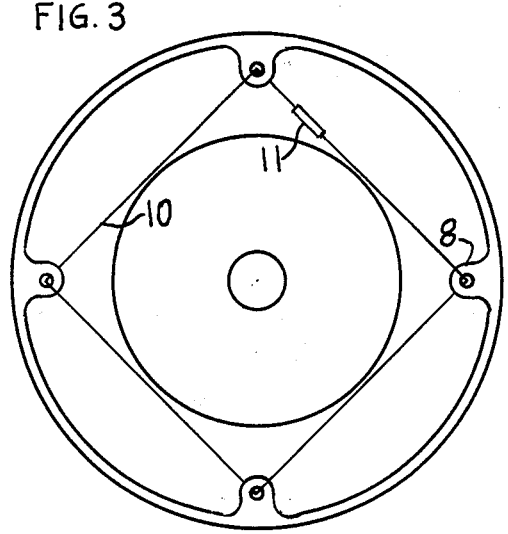
FIG. 4
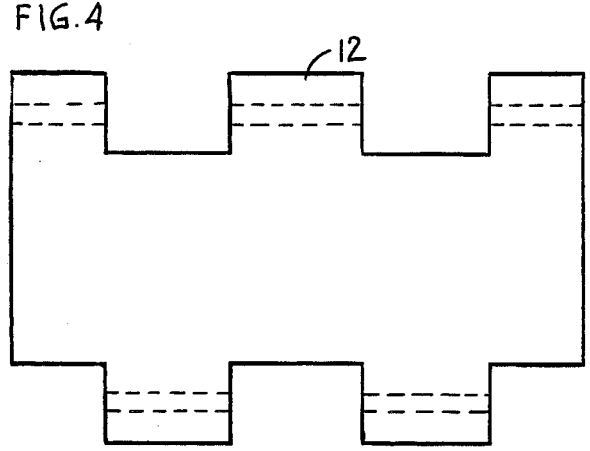

TIRE SNOW BELT

FIELD OF APPLICATION

Vehicles, particularly automobile tires.

BACKGROUND ART

Normal automobile tires are not suitble for driving on snow, when the road is inclined in a hilly or mountainous country. Special snow tires can be used where the snow covers the road for a longer period of time. They are expensive, take much storage space during warmer seasons and are not practical for those people who would need them only a few times in a year such as for a trip to the mountains during the winter. In addition these people would have to pay for installing the snow tires before the trip and then changing back to normal tires.

In order to overcome such difficulties the people use tire chains, which are satisfactory when the roads are covered by snow. However, when there is no snow or if the portions of the road are bare with the snow swept away by the wind, the chains are very noisy, damaging the road surface and can break. Even in the winter, on a busy highway the snow can be melted by traffic during the midday and bare surfaces can be exposed. The snow chains are difficult to mount on a tire because they are heavy and shapeless. When one end is placed over the tire, another person is needed to hold it because it would immediately fall down before the other end could be joined.

SUMMARY

The object of this invention is to increase the traction of normal tire without effecting the construction of the tire itself and the construction of the wheel for the purpose of enabling the automobile safe and easy driving steep roads covered by snow.

Tire Snow Belt, called Snow Belt for short built from rubber or similar material, can enable a car to go uphill on snow covered roads where normal driving tires would fail to go. Normal tires equipped with Snow Belts can go as well on snow and on loose sand as on bare roads. Because Snow Belts are made from rubber they are compatible with rubber tires, unlike the metal chains. They have protrusions on their outer surfaces that increases their traction on snow covered roads, prevent sliding on inclined surfaces and skidding on corners. Therefore, they increase driving safety. Snow Belts weigh less than snow chains and do not make a clanking noise while driving on bare roads. They are easier to mount on tires because they are not as cold to touch as metal chains in freezing temperatures and they keep their shape. Therefore, it is easy to hold them with bare hands on tires during mounting. Snow Belts will not damage the surface of the road and will not get broken when driving on a bare road. Therefore they can be mounted before a trip is started. They take little room in storage when they are not in use. They will fit tires more snugly than chains and they can be adapted for more than one tire size by using special inserts.

BRIEF DESCRIPTION

FIG. 1 is a top view on the portion of the Snow Belt.
FIG. 2 is a view 2—2 taken of FIG. 1.
FIG. 3 is a reduced scale side view of the Snow Belt installed on a tire with the protrusions omited.
FIG. 4 is a Snow Belt insert shown in reduced scale.

DESCRIPTION OF THE PREFERED EMBODIMENT

FIG. 1 shows Tire Snow Belt 1 with a multiplicity of protrusions 2 on its outside surface, properly shaped for easy manufacturing and good performance. These protrusions can be made in a simple conical form, as shown or they can have a rectangular, square or zigzag form. The Snow Belt may not necessarily be a continuous solid strip, but may be constructed with holes of various shapes enclosed by rubber links in its central portion. The links can be of suitable shape and thickness as necessary for a good traction. To install the Snow Belt it is bent around a tire, then a locking pin 3 is inserted through the locking holes 4, formed in the linking ends of the Snow Belt and is secured by a removable conventional cotter pin 5 and a standard washer 6. FIG. 2 shows that the linking ends of the Snow Belt have reinforcement 7 for greater strength. Lugs 8, which also may have reinforcement, extend from the sides of Snow Belt, have holes 9 provided near the distal end of each bug, through which a cord 10 is inserted for tying the Snow Belt on a tire or wheel as it is shown in FIG. 3. The term cord means also wire or wire cable. The ends of the cord are joined by using a conventional snap lock 11 with a tension spring. Two cords are used, one of each side of the tire, to keep the Snow Belt tight and in the center of the tire. FIG. 4 shows an insert 12 which can be connected between the ends of Snow Belt to adapt it for use on a larger tire size.

The illustrated Tire Snow Belt should not be regarded as a limitation of the scope of invention, but rather as an examplification of the preferred embodiment thereof. Many other varieties are possible, as for example, the inside surface of the Snow Belt may be roughened by small perforations to increase its adherence to the tire.

I claim:

1. A tire snow belt, being a strip of rubber, of such a length and width, to essentially cover circumferentially the radial outermost surface of the tire tread, when disposed thereover comprising
   (a) a multiplicity of protrusions on an outer surface, that are homogeneous with said tire snow belt,
   (b) linking ends of the same material as and integral with said tire snow belt, being locking portions of said snow belt, having rectangularly shaped locking protrusions with locking holes disposed therein,
   (c) lugs of the same material as and integral with the belt, said lugs being extended portions of said tire snow belt, that are positioned on both lateral sides thereof to provide means for tying said tire snow belt on tire, and
   (d) an insert of the same material and width as said tire snow belt, but with the length as required, so that it may connect said linking ends of said tire snow belt so said tire snow belt may be disposed circumferentially about a next larger tire size, said insert having locking protrusions capable of interconnecting with the locking protrusions of said tire snow belt.

2. The tire snow belt of claim 1, wherein said multiplicity of protrusions are spread evenly over the whole said outer surface.

3. The tire snow belt, of claim 1, wherein said rectangularly shaped locking protrusions with said locking holes therein, are so shaped, that when said tire snow belt is bent around a tire a locking pin can be inserted through said locking holes in said linking ends.

4. The tire snow belt of claim 1 wherein a reinforcement is embedded around said locking holes.

5. The tire snow belt of claim 1, wherein said means for tying comprises lug holes which are provided near the distal end of each lug, whereby a conventional cord can be inserted through said holes disposed on either side of said tire snow belt and a snap locking device disposed at the cord ends for joining thereof.

* * * * *